United States Patent
Machocki et al.

(10) Patent No.: US 11,629,990 B2
(45) Date of Patent: Apr. 18, 2023

(54) SYSTEM AND METHOD TO MEASURE MUD LEVEL IN A WELLBORE ANNULUS

(71) Applicant: SAUDI ARABIAN OIL COMPANY, Dhahran (SA)

(72) Inventors: Krzysztof Karol Machocki, Aberdeen (GB); Michael Anthony Affleck, Aberdeen (GB)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 268 days.

(21) Appl. No.: 16/880,023

(22) Filed: May 21, 2020

(65) Prior Publication Data
US 2021/0364336 A1    Nov. 25, 2021

(51) Int. Cl.
*G01F 23/68* (2006.01)
*E21B 47/047* (2012.01)
*E21B 47/12* (2012.01)

(52) U.S. Cl.
CPC .......... *G01F 23/686* (2013.01); *E21B 47/047* (2020.05); *E21B 47/12* (2013.01)

(58) Field of Classification Search
CPC ........ E21B 47/047; E21B 47/12; G01F 23/68; G01F 23/686
See application file for complete search history.

(56) References Cited

U.S. PATENT DOCUMENTS

| | | | |
|---|---|---|---|
| 2,610,506 A | | 9/1952 | Taliaferro et al. |
| 3,268,017 A | * | 8/1966 | Yarbrough ............ E21B 21/12 175/215 |
| 4,255,975 A | * | 3/1981 | Debreuille ............ G01F 23/68 33/313 |
| 5,915,478 A | | 6/1999 | Brown et al. |
| 6,237,691 B1 | | 5/2001 | Kelley et al. |
| 6,443,228 B1 | * | 9/2002 | Aronstam ............ E21B 47/12 73/152.55 |

(Continued)

FOREIGN PATENT DOCUMENTS

| CN | 105275454 A | 1/2016 |
|---|---|---|
| CN | 106761689 A | 5/2017 |

(Continued)

OTHER PUBLICATIONS

International Search Report issued in corresponding International Application No. PCT/US2020/035166, dated Feb. 2, 2021 (4 pages).

(Continued)

*Primary Examiner* — Shane Bomar
(74) *Attorney, Agent, or Firm* — Osha Bergman Watanabe & Burton LLP

(57) ABSTRACT

Systems include a floating device disposed on a top of a column of drilling fluid in an annulus of a wellbore. The floating device includes a capsule. A transmitter or a reflector may be coupled to the capsule. The floating device may transmit signals to a surface region from the annulus or receive signals from the surface region and reflect at least a portion of the received signals. A receiver in the surface region receives transmitted signals or reflected signals from the floating device and determines a distance between the floating device and a reference point in the surface region. The distance indicates a level of the drilling fluid in the annulus.

15 Claims, 5 Drawing Sheets

(56) References Cited

U.S. PATENT DOCUMENTS

| | | | |
|---|---|---|---|
| 9,250,339 B2* | 2/2016 | Ramirez | G06F 17/00 |
| 9,540,924 B2* | 1/2017 | Klass | G02B 6/4214 |
| 9,964,425 B2* | 5/2018 | Kim | G01F 23/0038 |
| 11,414,963 B2* | 8/2022 | Li | E21B 47/047 |
| 2010/0101774 A1 | 4/2010 | Ocondi et al. | |
| 2011/0247826 A1 | 10/2011 | McCann | |
| 2012/0132418 A1* | 5/2012 | McClung, III | E21B 47/13 |
| | | | 166/250.12 |
| 2013/0025943 A1* | 1/2013 | Kumar | E21B 49/084 |
| | | | 175/58 |
| 2016/0168978 A1 | 6/2016 | Kozak et al. | |
| 2016/0348502 A1* | 12/2016 | Kim | G08C 17/00 |
| 2017/0350241 A1* | 12/2017 | Shi | E21B 47/26 |
| 2018/0010438 A1 | 1/2018 | Ravi et al. | |
| 2019/0101872 A1* | 4/2019 | Li | G05B 15/02 |
| 2021/0301648 A1* | 9/2021 | Li | G01F 23/30 |

FOREIGN PATENT DOCUMENTS

| | | |
|---|---|---|
| CN | 108871509 A | 11/2018 |
| CN | 109209347 A | 1/2019 |
| JP | H1048026 A | 2/1998 |
| RU | 2038473 C1 | 6/1995 |
| RU | 2612704 C1 | 3/2017 |
| RU | 2623756 C1 | 6/2017 |

OTHER PUBLICATIONS

Written Opinion issued in corresponding International Application No. PCT/US2020/035166, dated Feb. 2, 2021 (7 pages).

* cited by examiner

SYSTEM AND METHOD TO MEASURE MUD LEVEL IN A WELLBORE ANNULUS

BACKGROUND

In drilling operations, it is normally important to keep the hydrostatic pressure of a mud column in the wellbore within a particular range for the drilled zone in order to prevent any influxes or wellbore collapse. When the drill string is in the wellbore, the mud column is formed in an annulus between the drill string and a wall of the wellbore. Hydrostatic pressure in the mud column is related to the mud level (height or depth of the mud column) and mud weight. The mud column may extend from the bottom of the wellbore to the surface, where changes in the mud level can be read. In some cases, the mud column may not extend to the surface, either because of conditions downhole or due to the drilling technique. In severe lost circulation scenarios, where the mud pumped into the wellbore flows into the formation instead of rising up the annulus, the mud level in the annulus might drop, resulting in reduction in the hydrostatic pressure of the mud column. In cases where the mud column extending to the surface is relied on for keeping the hydrostatic pressure within a desired range, this drop in mud level may also prevent reading of mud level changes at the surface and measurement of mud properties that impact safety of the drilling operation.

The drill string needs to be pulled out of the wellbore from time to time, e.g., in order to change a drill bit or make measurements downhole. This process is typically referred to as pulling a drill string out of a hole, or "POOH". Typically, the drill string is pulled out of the wellbore a few joints of drill pipe at a time. When POOH dry, i.e., mud is not pumped into the wellbore while pulling drill pipes out of the hole, the level of the mud column can drop as the mud flows from the mud column to occupy the volume previously occupied by the removed drill pipes. Usually, after some number of drill pipes have been removed from the wellbore, mud is circulated to fill the wellbore. However, in some situations, the drop in mud level during POOH dry may be sufficient to induce influx into the wellbore. In some scenarios, such influx might be difficult to notice.

Without the ability to measure the mud level in the annulus, it might be difficult to detect well control events (influxes into the wellbore). In some cases, there might be a large delay in noticing influx into the wellbore, and such delay could have catastrophic consequences, resulting even in blowouts.

SUMMARY

A system for detecting mud level changes includes a floating device disposed on top of a column of drilling fluid in an annulus of a wellbore. The floating device includes a capsule and a transmitter coupled to the capsule. The transmitter emits a signal in a direction up the annulus. The system includes a receiver positioned in a surface region above the wellbore. The receiver detects the signal emitted by the transmitter. The system includes a processor in communication with the receiver. The processor determines a distance between the floating device and a reference point in the surface region based on the detected signal. The distance indicates a level of the drilling fluid in the annulus. The transmitter may be disposed inside the capsule. The system may include a power source disposed inside the capsule and in communication with the transmitter. The transmitter may include an acoustic wave transmitter. The transmitter may include an electromagnetic wave transmitter. The electromagnetic wave transmitter may be a light source. The floating device may include at least two transmitters emitting different types of signals and disposed inside the capsule. The different types of signals may include acoustic waves and electromagnetic waves. The system may include a flow conduit arranged in the surface region and in fluid communication with the annulus. The flow conduit may have a flow outlet for outflow of drilling fluid received from the annulus. The receiver may be positioned proximate the flow conduit. The system may include a mesh cover disposed at the flow outlet to prevent the floating device from passing through the flow outlet. The system may include a drill string disposed in the wellbore. The capsule may have a size or flexibility to pass through a nozzle of a drill bit included in the drill string.

A system for detecting mud level changes includes a transmitter positioned in a surface region above a wellbore. The transmitter includes a light source to output a light signal that is directed into an annulus of a wellbore. The system includes a floating device disposed on top of a column of drilling fluid in the annulus of the wellbore. The wellbore includes a capsule and a reflector coupled to the capsule. The reflector reflects at least a portion of the light signal from the transmitter. The system includes a receiver positioned in the surface region. The receiver detects the reflected light signal from the floating device. The system includes a processor in communication with the receiver. The processor determines a distance between the floating device and a reference point in the surface region based on the detected signal. The distance is indicative of a level of drilling fluid in the annulus. The reflector may include a reflective material disposed on a surface of the capsule. The reflector may have characteristics to reflect a select portion of a wavelength range of the light signal received from the transmitter. The light source may be a visible light source or an infrared light source.

A method for detecting mud level changes includes deploying a floating device including a transmitter on top of a column of drilling fluid in an annulus of a wellbore. The method includes positioning a surface device including a receiver in a surface region above the wellbore. The method includes emitting a signal from the transmitter in the floating device in a direction up the annulus. The method includes detecting the signal from the transmitter at the receiver. The method includes determining a distance between the floating device and a reference point in the surface region from the detected signal. The annulus may be formed between the wellbore and a drill string disposed in the wellbore. The acts of emitting the signal, detecting the signal, and determining the distance may be performed during a drilling operation with the drill string or while pulling the drill string out of the wellbore. The method may include emitting signals from two different types of transmitters included in the floating device, detecting signals from the two different types of transmitters at two different types of receivers included in the surface device, determining two distances between the floating device and the reference point in the surface region based on the detected signals by the two different types of receivers, and recalibrating the distance determined between the floating device and the reference point in the surface region based on the two distances.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
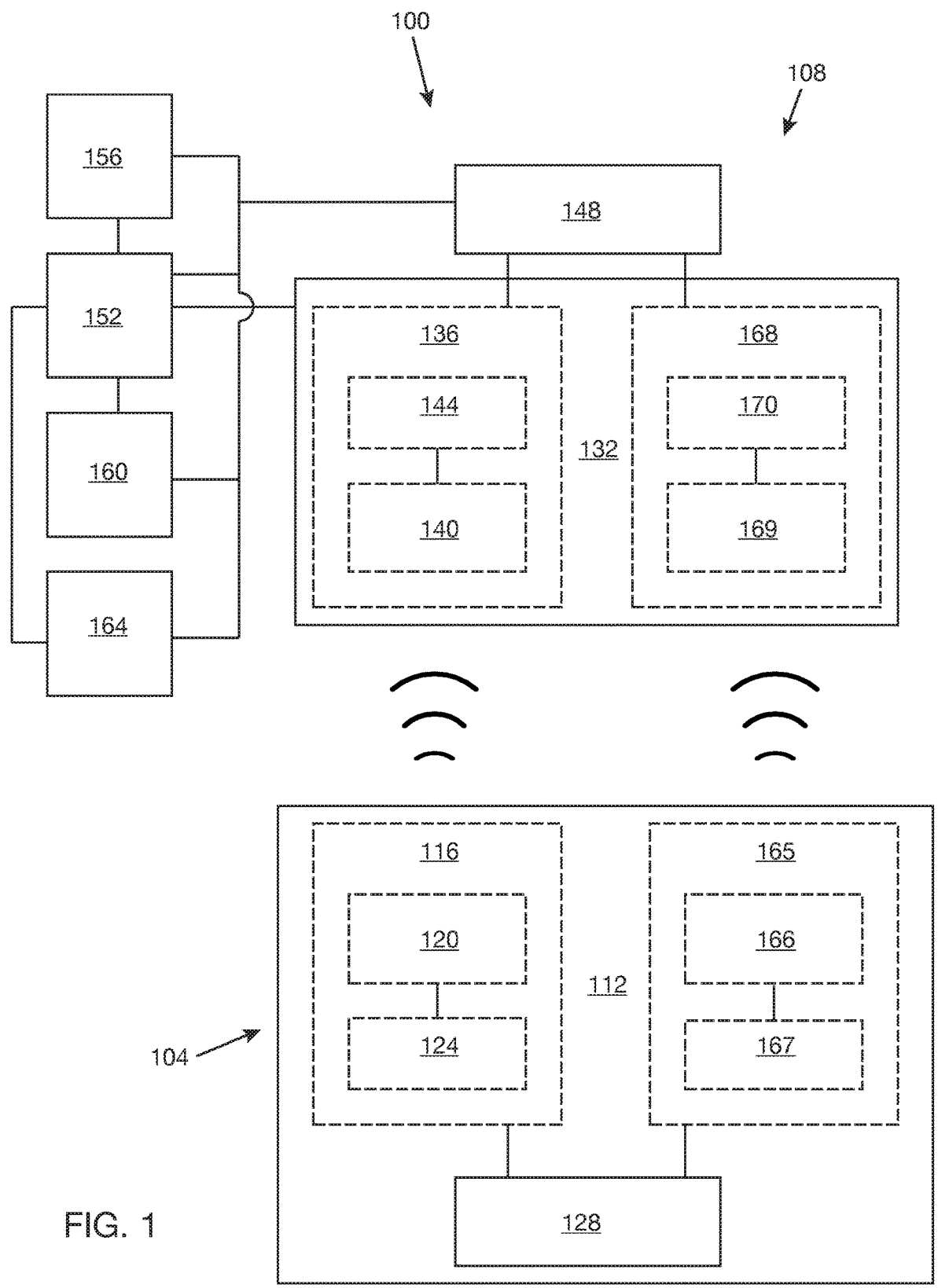
FIG. 1 is a block diagram of a system for measuring mud level in an annulus of a wellbore according to one illustrative implementation.

In this detailed description, certain specific details are set forth in order to provide a thorough understanding of various disclosed embodiments and implementations. However, one skilled in the relevant art will recognize that embodiments and implementations may be practiced without one or more of these specific details, or with other methods, components, materials, and so forth. In other instances, related well known features or processes have not been shown or described in detail to avoid unnecessarily obscuring the embodiments and implementations. For the sake of continuity, and in the interest of conciseness, same or similar reference characters may be used for same or similar objects in multiple figures.

FIG. 1 shows a block diagram of a system 100 of measuring mud level in an annulus in a wellbore according to one illustrative implementation. "Mud" or "drilling mud" is synonymous with drilling fluid, which is fluid used in operations to drill wellbores in subsurface formations. System 100 may be used while drilling and while pulling a drill string out of a wellbore. System 100 includes a floating device 104 that is to be deployed in the annulus and a surface device 108 that is to be positioned at the surface. Typically, surface device 108 is positioned proximate a surface end of the annulus to allow a clear signal transmission path between transmitter(s) in floating device 104 and receiver(s) in surface device 108. In one implementation, floating device 104 includes a transmitter module 112, which is disposed in or otherwise coupled to a floatable body. In one example, transmitter module 112 includes one or more transmitters to emit signals at prespecified frequencies. The transmitters are capable of emitting signals that travel over a long distance, e.g., over a distance of between 1 ft and 5,000 ft, or in some cases between 1 ft and 15,000 ft. In one example, transmitter module 112 includes an acoustic wave transmitter 116 that emits acoustic waves. The term "transmitter" as used here and elsewhere in the disclosure will generally encompass both a transmitter and a transmitter part of a transceiver. In general, transmitter module 112 may have one or more acoustic wave transmitters. The acoustic wave transmitter may be, for example, an ultrasonic transmitter. In one example, acoustic wave transmitter 116 includes a transducer 120, such as an ultrasonic transducer, e.g., a piezoelectric transducer or magnetostrictive transducer, and transmitter circuit 124 that is in communication with the transducer. Transmitter circuit 124 may include a processor circuit to generate a digital signal and a digital-to-analog (DAC) circuit to convert the digital signal to an analog signal. The processor circuit may add a time stamp to the digital signal before the digital signal is converted to an analog signal. Transducer 120 converts the analog signal to an acoustic signal, which is then emitted from acoustic wave transmitter 116. Transmitter module 112 may include a battery 128 (or other portable power source) to supply power to transmitter 116.

Surface device 108 includes a receiver module 132. In one example, receiver module 132 includes one or more receivers to detect signals emitted from transmitter module 112. In one example, receiver module 132 includes an acoustic wave receiver 136 that is capable of detecting acoustic waves. The term "receiver" as used here and elsewhere in the disclosure will generally encompass both a receiver and a receiver part of a transceiver. In general, receiver module 132 may have one or more acoustic wave receivers to detect acoustic waves. Acoustic wave receiver 136 may be, for example, an ultrasonic receiver. In one example, acoustic wave receiver 136 includes a transducer 140, such as an ultrasonic transducer, and a receiver circuit 144 that is in communication with the transducer. Transducer 140 converts an acoustic signal to an analog signal. Receiver circuit 144 may include an analog-to-digital converter (ADC) to receive the analog signal from acoustic wave receiver 140 and output a digital signal and a processor circuit to receive the digital signal and process the digital signal. For example, the processor circuit may preprocess the digital signal to remove noise and may add a time of arrival to the digital signal. Receiver module 132 may receive power from battery 148 (or other portable power source) of surface device 108 or from an external power source that is in communication with surface device 108.

To use system 100, one or more floating devices 104 are deployed into the wellbore annulus whose mud level is to be monitored. During a drilling operation in the wellbore or while the drill string is being pulled out of the wellbore, each floating device 104 via its transmission module 112 will emit signals from its location in the annulus. Since floating device 104 is floating on the mud in the annulus, this location will be representative of the mud level in the annulus. Floating device 104 may emit signals at specific intervals, e.g., every ten seconds. As floating device 104 emits signals, surface device 108 via its receiver module 132 detects the signals. Receiver module 132 may output a digital signal in response to a detected signal from transmission module 112. Surface device 108 may include a processor 152 that receives the digital signal from receiver module 132 and determines a distance between the floating device and a reference point at the surface, e.g., the location of receiver module 132, from the signal. The determination may be based on time information contained in the signal and a calibration curve that maps time delay between transmitter and receiver to distance. The distance will be indicative of the mud level in the annulus. Surface device 108 may include memory 156 to store the distance determined by processor 152 and other data. Processor 152 may output the distance on a display 160 or may transmit the distance over a network via a communication module 164. Processor 152 may generate alerts including the distance and display or transmit the alerts, e.g., to a driller, via communication module 164. Processor 152 may routinely generate the alerts and/or generate the alerts only if the mud level falls below a prespecified level or if there is a change in the rate at which the mud level is dropping. For example, processor 152 may generate an alert if the mud level is dropping constantly at a first rate and this rate then changes to a second rate that is significantly different from the first rate. An alert may also be generated if a drop in mud level stops and then the mud level starts to rise, which may indicate a wellbore kick, i.e., influx of hydrocarbons into the wellbore that can result in catastrophe if not detected.

Transmitter module 112 may include an electromagnetic (EM) wave transmitter 165 that emits EM waves, which may be any of radio waves, microwaves, visible light, and infrared light. EM wave transmitter 165 may be used in addition to acoustic wave transmitter 116 or in lieu of acoustic wave transmitter 116. Transmitter module 112 may have one or more EM wave transmitters to emit EM signals. EM wave transmitter 165 may include a transmitter circuit 167 to generate a digital signal with a timestamp and a transducer 166 to convert the digital signal to an EM signal, which is then emitted from transmitter module 112. Correspondingly, receiver module 132 may include an EM wave receiver 168 that detects EM waves. EM wave receiver 168 may include a transducer 169 to convert an EM signal to an analog signal and receiver circuit 170 to convert the analog signal to a digital signal and apply a time of arrival to the digital signal. Where transmitter module 112 includes two types of transmitters, e.g., acoustic and EM wave transmitters, the system has an opportunity to use differences in distances calculated from the two types of signals to recalibrate the measured distance between surface device 108 and floating device 104 and a reference point at the surface.

The system may be calibrated prior to deploying the floating device into the annulus or after deploying the floating device into the annulus. The difference in time between when a transmitter sends a signal and when the receiver receives the signal may be referred to as a time delay. Initially, a calibration curve that relates time delay to distance between the transmitter and the receiver is generated. For the calibration of the system, the receiver is placed at a known distance from the transmitter, and the transmitter is operated to emit a signal. The difference between the time at which the transmitter emits the signal and the time at which the emitted signal is received at the receiver gives a measured time delay at a known distance, e.g., 1 m, 5 m, and 20 m. The measured time delay can be compared to the time delay obtained for the known distance from the calibration curve. This process can be repeated at other known distances. If there are significant errors between the measured time delay and the time delay from the calibration curve, the calibration curve may be adjusted such that the measured time delay corresponds to the correct distance on the adjusted calibration curve. After any adjustments, the calibration process may be repeated to confirm that the time delays determined from the system are within allowed error values. Some calibrations may require making measurements under conditions similar to downhole conditions, e.g., a long metal tube with another metal tube inside and a drilling mud type vapor in the area between the transmitter and receiver.

Figure 2:
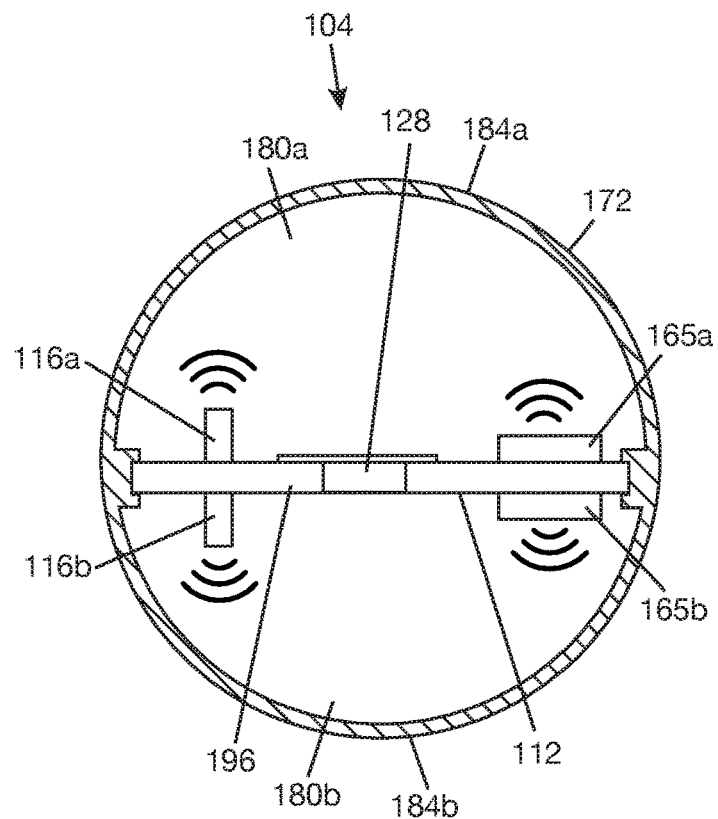
FIG. 2 is a cross-section of a floating device of the system of FIG. 1 according to one illustrative implementation.

In order to allow floating device 104 to float on mud, floating device 104 may be configured to have an average density that is less than that of water, which is typically a major component of mud. FIG. 2 shows an example physical implementation of floating device 104. In FIG. 2, floating device 104 includes a capsule 172, which may be made of a lightweight material or a combination of lightweight materials. For example, capsule 172 may have two parts that are fitted together to define an enclosed volume, and the two parts may be made of the same material or different materials. Examples of suitable materials for making capsule 172 may be thermoplastic polymers, e.g., polycarbonates, rubber materials, e.g., ethylene propylene diene monomer (EPDM) rubber, Silicone rubber, Neoprene rubber, Viton, Natural rubber, and synthetic rubber, plastic materials, hybrid composite materials, and materials that will have a combination of elements, e.g., a combination of rubber and, for example, plastics or fibers. In a non-limiting example, capsule 172 may have a generally round shape, which may or may not be a spherical shape. Transmitter module 112 is disposed within capsule 172. Chambers 180a, 180b may be defined on opposite sides of transmitter module 112. Chambers 180a, 180b may be filled with gas, e.g., air or hydrogen, or a lightweight liquid, such as oil, to keep the average density of floating device 104 below that of water. Capsule 172 has a side 184a adjacent to chamber 180a and a side 184b adjacent to chamber 180b. In one example, chambers 180a, 180b may have substantially the same volume and contain the same type of fluid such that when floating device 104 is deployed in an annulus of a wellbore, either of side 184a and 184b of capsule 172 may be the top side of floating device 104.

FIG. 2 shows transmitter module 112 with two transmitters 116a, 116b of the same type as acoustic wave transmitters 116 (in FIG. 1) and two transmitters 165a, 165b of the same type as EM wave transmitters 165 (in FIG. 1). Transmitters 116a, 165a may be arranged to transmit in a direction towards side 184a of capsule 172, and transmitters 165a, 165b may be arranged to transmit in a direction towards side 184b of capsule 172. In this way, if side 184a is the top side of floating device 104, transmitter 116a, 165a will emit the signals that are detected by the surface device. On the other hand, if side 184b is the top side, transmitters 116b, 165b will emit the signals that are detected by the surface device. Transmitters may be mounted on a printed circuit board (PCB) 196, which may also carry the transmitter circuits (124, 167 in FIG. 1). Battery 128 may be coupled to PCB 196. As previously noted, one type or two different types of transmitters may be included in transmission module 112. Therefore, it is possible to omit transmitters 165a, 165b from transmission module 112, in which case mud level will be measured by acoustic waves only. Alternatively, transmitters 116a, 116b may be omitted such that mud level will be measured by EM waves only. When two types of transmitters are present, then it may be possible to recalibrate the measured distance between the surface and floating device 104 after the floating device has been deployed into the annulus, i.e., based on a comparison between distances measured by the two different signals.

Figure 3:
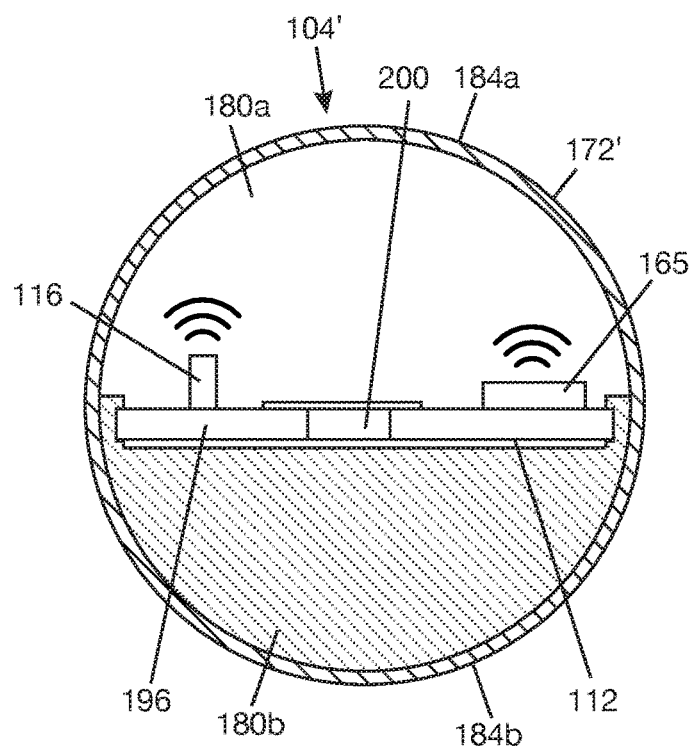
FIG. 3 is a cross-section of a floating device of the system of FIG. 1 according to another illustrative implementation.

FIG. 3 shows an alternative floating device 104' that is configured to have a clear top side and bottom side. The average density of floating device 104' is kept below that of water so that floating device 104' can still float on mud. In the illustrated example of FIG. 3, chamber 180b has substantially the same volume as chamber 180a, but chamber 180b has been filled with a material that is denser than the material contained in chamber 180a. This makes the part of floating device 104' including chamber 180b to be heavier than the part of floating device 104' including chamber 180a. It is also possible to make the volume of chamber 180b greater than that of chamber 180a and fill chamber 180b with a material of greater or equal density than the material in chamber 180a. When floating device 104' is deployed in an annulus of a wellbore, side 184a of capsule 172 will be the top side of the floating device. In this case, the transmitters that emit signals in a direction towards side 184b, which would be the bottom side of the floating device, can be omitted. FIG. 3 shows only transmitters 116, 165 that are arranged to emit signals in a direction towards the top side 184a of capsule 172.

Figure 4:
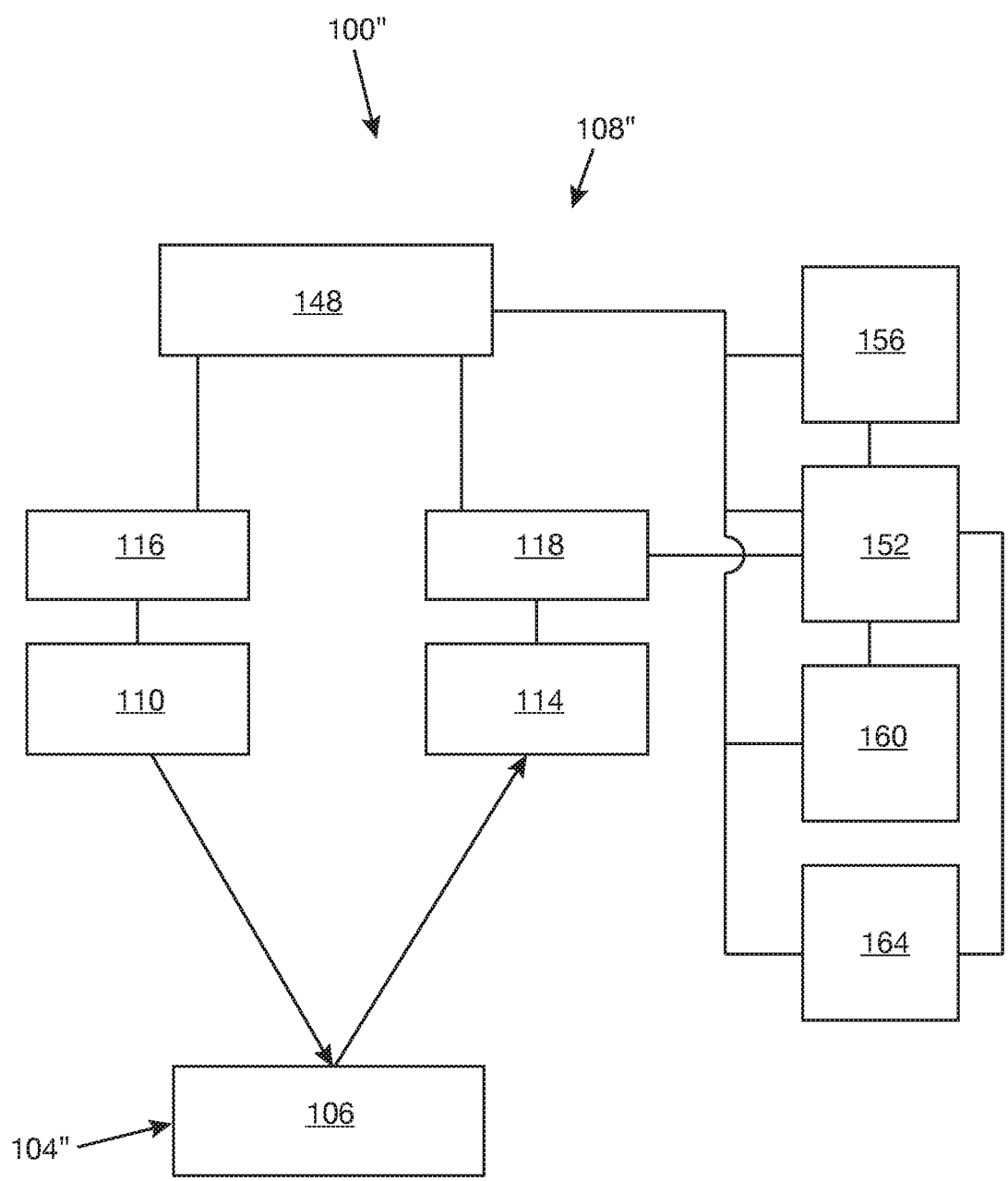
FIG. 4 is a block diagram of a system for measuring mud level in an annulus of a wellbore according to another illustrative implementation.

FIG. 4 shows an alternative system 100" of measuring mud level in an annulus in a wellbore. In system 100", surface device 108" includes an EM wave transmitter 110 to emit EM signals, and floating device 104" includes a reflector 106 to reflect the EM signals back to surface device 108". Consequently, surface device 108" also includes an EM wave receiver 114 to receive reflected EM signals from floating device 104". In some cases, EM wave transmitter 110 and EM wave receiver 114 may be parts of an EM wave transceiver. In one implementation, EM wave transmitter 110 emits visible light signals or infrared light signals. In this case, EM wave transmitter 110 may include a light source, such as a laser source, to generate the visible light or infrared light. EM wave transmitter 110 may output single wavelength light or multiplexed wavelength light, i.e., light with different wavelengths. In this example, reflector 106 may be a highly reflective surface or a material or structure that reflects all or a narrow range of the wavelengths received from EM wave transmitter 110. As an example, reflector 106 may be a surface coated with a metallic material, such as silver. Other examples of reflectors may be diffraction grating or a dichroic filter, which may be designed to reflect only selected wavelengths while allowing others to pass through. In this example, EM wave receiver 114 will be a photodetector that is tuned to detect the range of wavelengths reflected by reflector 106. In the system of FIG. 3, floating device 104" does not need a battery or power source. Surface device 108" may include a transmitter circuit 116 associated with EM wave transmitter 110 and a receiver circuit 118 associated with EM wave receiver 114. Processor 152 may receive data from receiver circuit 118 and process the data to determine the distance between a reference point at the surface, e.g., a position of transmitter 110 or receiver 114, and floating device 104". This distance can be correlated to the mud level in the annulus. Components 110, 116, 114, 118 may be powered by battery 148 or by external power. The remaining parts of system 100" may be as described with reference to FIG. 1. System 100" may be calibrated in the same manner described for system 100 in FIG. 1.

Figure 5:
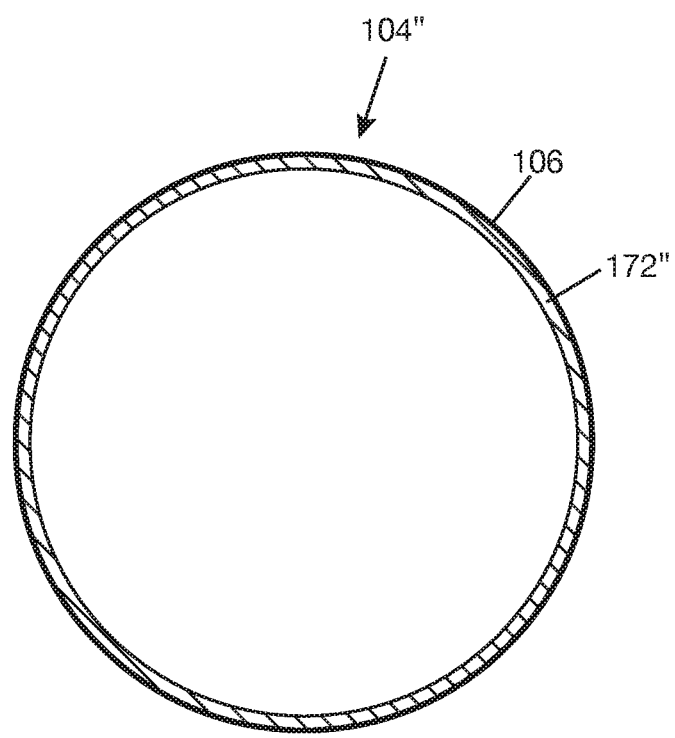
FIG. 5 is a cross-section of a floating device of the system of FIG. 4 according to one illustrative implementation.

FIG. 5 shows an example physical implementation of floating device 104". In FIG. 5, floating device 104" includes capsule 172" with an internal chamber that may be filled with a lightweight liquid, such as oil, or gas, e.g., air or hydrogen, such that the average density of floating device 104" is below the density of water. Reflector 106 in this example is a highly reflective material applied on an outer surface of capsule 172", e.g., as a coating. Reflector 106 may be a metallic material, such as silver, applied as a coating on the outer surface of capsule 172" or may be a multilayer dielectric mirror coating applied on the outer surface of capsule 172". Reflector 106 may be disposed on the entire outer surface of capsule 172" or on just a portion of the outer surface of capsule 172". Where reflector 106 is disposed on just a portion of outer surface of capsule 172", buoyancy features may be incorporated in capsule 172" such that the portion of the outer surface where reflector 106 is located will be the top side of floating device 104" when the floating device 104" floats on mud. An example of such buoyancy features has been described with reference to FIG. 3.

Figure 6:
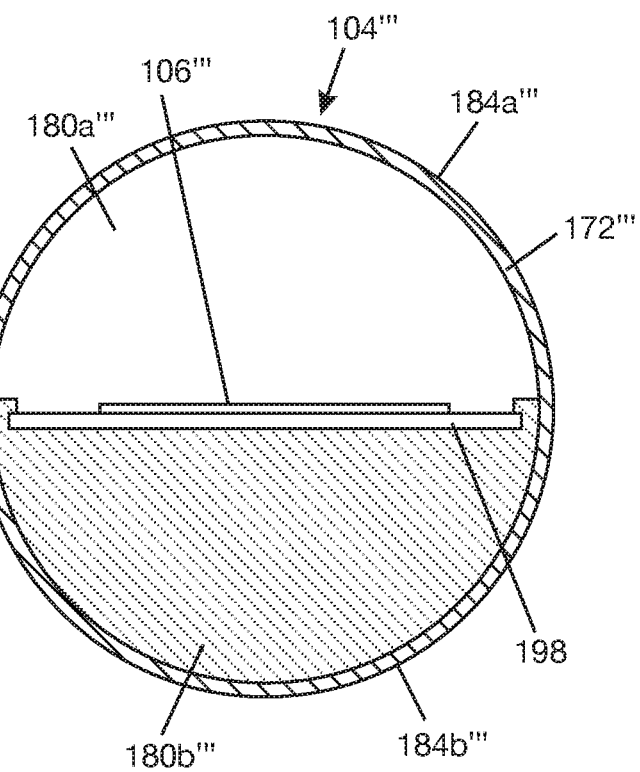
FIG. 6 is a cross-section of a floating device of the system of FIG. 4 according to another illustrative implementation.

FIG. 6 shows an alternative configuration 104''' of the floating device of FIG. 5, where reflector 106''' is disposed inside capsule 172'''. In this case, floating device 104''' may be bottom heavy so that reflector 106''' faces the top side 184a''' of capsule 172'''. As an example, chambers 180a''', 180b''' may be formed on either side of reflector 106'''. Chamber 180b''' below reflector 106" may contain a material that is heavier than the material in chamber 180a''' above reflector 106'''. Reflector 106''' may be a material or structure that reflects some wavelengths of light while allowing others to pass through. Examples of such reflectors may be a diffraction grating or a dichroic filter. In the example of FIG. 6, at least top side 184a''' will need to be transparent to light signals emitted by surface device 108" (in FIG. 4). Reflector 106''' may be supported on a substrate 198. The material of substrate 198 and the material(s) below substrate 198 (e.g., the materials in chamber 180b''' and the material of side 184b''' adjacent to chamber 180b''') may absorb or may be transparent to the wavelengths that pass through reflector 106'''.

Figure 7:
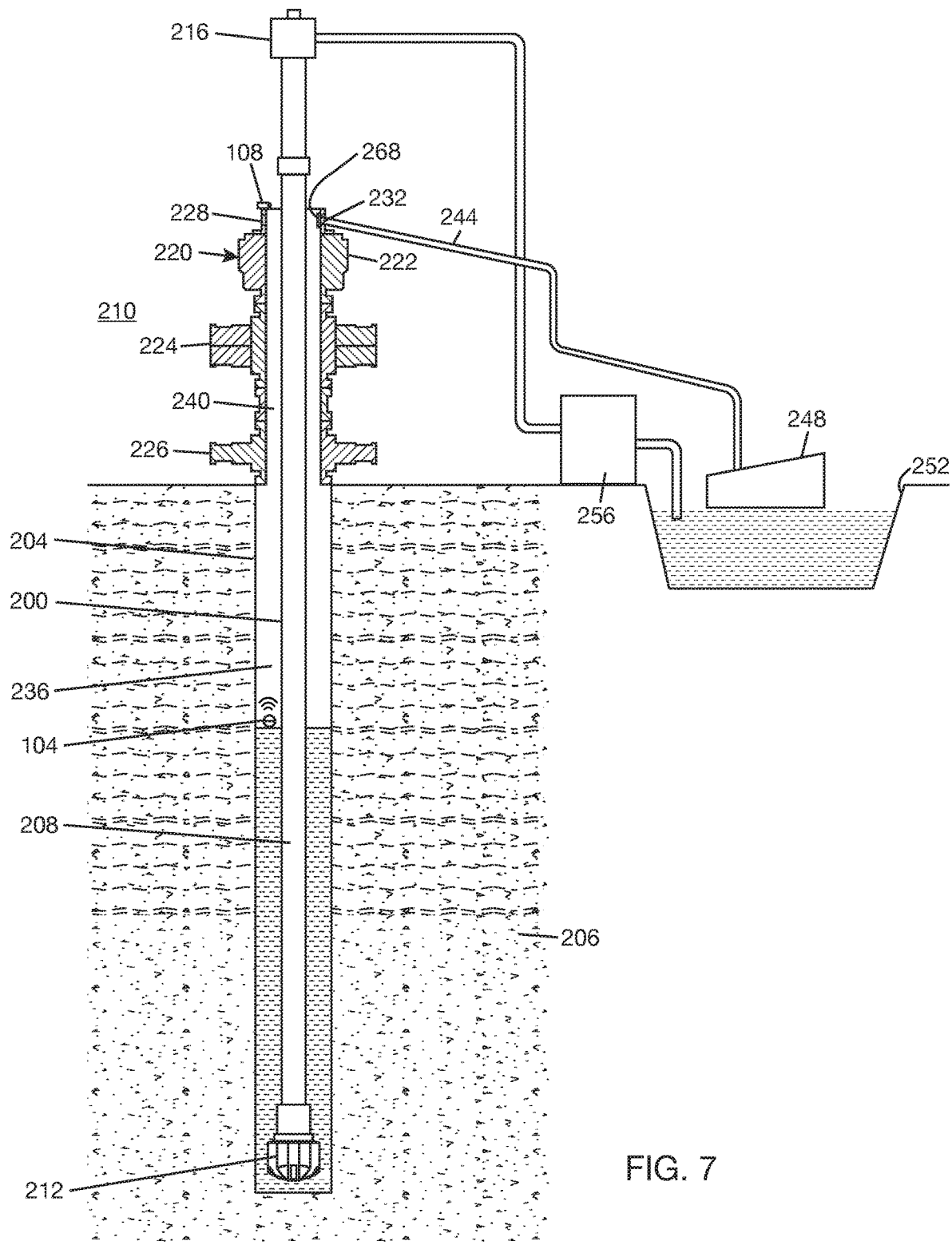
FIG. 7 is a drilling system employing a system of measuring mud level according to any one of FIGS. 1-6.

FIG. 7 illustrates an exemplary drilling environment in which the system of measuring mud level (100 in FIGS. 1-3, 100" in FIGS. 4-6) may be deployed. A drill string 200 is suspended in the wellbore 204 formed in a subsurface region 206. Drill string 200 includes one or more drill pipes 208 connected to form a conduit and a drill bit 212 at the end of the conduit. Drill string 200 may have several other tools not specifically identified but known in the art. A top drive 216 is positioned in a surface region 210 above wellbore 204. A top drive 216 is coupled to the top of drill string 210 and is operable to rotate drill string. Alternatively, drill string 210 may be rotated by means of a rotary table on a rig floor. Top drive 216 is movable up and down. The mechanisms that allow top drive 216 to be movable are not shown but may generally include a traveling block that is coupled to the top drive, a derrick with a crown block that supports the traveling block, and a pulley system that moves the traveling blocking up and down the derrick, as is well known in the art. A wellhead assembly 220 is disposed above wellbore 204. In the illustrated example, wellhead assembly 220 includes a stack of blowout preventers 222, 224, 226 and a bell nipple 228 attached to the top of the stack of blowout preventers—the exact configuration of the stack of blowout preventers are merely for illustrative purposes. Bell nipple 228 is a large diameter pipe with a side outlet 232.

The components of wellhead assembly 220 have bores that are aligned with wellbore 204, which allows drill string 200 to extend through wellhead assembly 220 into wellbore 204. A well annulus 236 is formed between drill string 200 and wellbore 204. A surface annulus 240 is formed between drill string 200 and wellhead assembly 220. Surface annulus 240 is in communication with well annulus 236. As a result, fluid in well annulus 236 can rise up into surface annulus 240 and exit through side outlet 232 of bell nipple 228. A flow conduit with a side outlet for exit of fluid from surface annulus 240 may be at other positions in wellhead assembly 220, such as above blowout preventer 226. For the illustration shown in FIG. 7, side outlet 232 of bell nipple 228 is connected to a flow line 244, which empties out into a shale shaker 248 (part of a mud treatment system). The fluid passing out of shale shaker 248 may be conditioned for recirculation into wellbore 204 and then fed into a mud pit 252. A pump 256 pumps mud (drilling fluid) from mud pit 252 into drill string 200. The mud may flow into drill string 200 through appropriate pathways in top drive 216 (or through a rotary swivel if a rotary table is used instead of a top drive to rotate the drill string).

During drilling, mud is pumped down drill string 200. The mud exits through nozzles in drill bit 212 into the bottom of wellbore 204 and then rises up well annulus 236. The hydrostatic pressure of the mud column in well annulus 236 needs to be controlled to prevent the well from kicking, either during drilling or when pulling a drill string out of the well. A well kick is forced fluid flow from a drilled formation into a wellbore due to the pressure found in the drilled formation being higher than the mud hydrostatic pressure acting on the wellbore. If the kick is not controlled, a blowout may occur. While drill string 200 is in wellbore 204 such that well annulus 136 exists, the hydrostatic pressure that acts on the wellbore is the hydrostatic pressure of the mud column in well annulus 236. In general, hydrostatic pressure of a column of fluid is the product of the height of the column of fluid and the specific gravity of the fluid. Once a mud weight is selected, well control may generally involve controlling mud circulation to maintain a certain level of mud in well annulus 236.

Floating device 104, or any variants thereof previously described, is deployed in well annulus 236. Floating device 104 may be deployed in well annulus 236 by simply dropping floating device 104 into well annulus 236 from the surface. An alternative method is to pump floating device 104 down drill string 200, where floating device 104 will exit through a nozzle of drill bit 212 into the bottom of wellbore 204 and then rise up well annulus 236 to the top of the mud column in well annulus 236. In this case, floating device 104 should be sized to pass through the nozzle of drill bit 212. In some cases, the diameter of floating device 104 to enable exit through a drill bit may be about 1.5 inches. In some cases, the hole restriction in the drill bit may be less than 1 inch. In these cases, floating device 104 may be slightly larger than the hole restriction in the drill bit, but the capsule of floating device 104 may be made of flexible material, such as rubber, so that floating device 104 can be squeezed through the nozzle of drill bit 212. In this case, electronics of floating device 104 may also be on a flexible substrate. Surface device 108, or any variants thereof, is positioned at the surface, typically close to wellbore 204 or close to a surface end of well annulus 136. In the illustrated example, surface device 108 is mounted on bell nipple 228. Since floating device 104 may rise with the mud level into surface annulus 240 and up to side outlet 232 of bell nipple 228, a flow line cover 268 may be mounted at side outlet 232 to prevent floating device 104 from escaping into flow line cover 244. Flow line cover 268 may include a mesh material having openings smaller than floating device 104. The mesh material will allow mud to flow through while preventing floating device 104 from passing through. The openings of the meshed material can have shapes to restrict passage of floating device 104 while allowing rock debris to go through. For example, if floating device 104 has a spherical shape, the mesh openings can have shapes that would not allow spherical shapes of a certain size to go through. Such shapes could be, for example, a long rectangular shape or a hexagonal shape. A mesh could openings with a mix of shapes. In addition, flow line cover 268 is removable and may not be installed at side outlet 232 when drilling in conditions where the mud level will always be below side outlet 232. The mesh material could be metal or plastic.

While drilling with drill string 200 or while pulling drill string 200 out of wellbore 204, floating device 104 will emit signals in a direction up well annulus 236. Surface device 108 will detect the signals and determine a distance between floating device 104 and a surface reference point, e.g., a location of surface device 108, from the detected signals. This distance is indicative of the mud level in well annulus 236. Surface device 108 may display the distance and/or send alerts informing the driller of the distance. In some cases, floating device 104 may send two different types of signals up well annulus 236. Surface device 108 will detect the two different types of signals and may determine two distances from the two different types of signals. If there are significant differences between the two distances, surface device 108 may determine which of the two distances is likely to be more accurate and recalibrate the other distance. As an example, surface device 108 may have a first calibration curve that is associated with the first type of signal and that is used to determine distance based on time information contained in the first type of signal. Surface device 108 may also have a second calibration curve that is associated with the second type of signal and that is used to determine distance based on time information contained in the second type of signal. Recalibration may involve adjusting the first calibration curve so that it yields the same distance information as the second calibration curve, or vice versa. In some cases, multiple floating devices 104 may be deployed into well annulus 236, each floating device emitting signals at a different frequency. The different frequencies may be selected to help with recalibration between the floating device and surface device. In some implementations, one of the multiple floating devices may emit one type of signal and another one of the multiple floating devices may emit another type of signal. Recalibration may be based on the two different types of signals in the same manner described above for a single floating device that emits two different types of signals.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art. The teachings provided herein can be applied to other drilling environments, not necessarily the exemplary drilling environment generally described above.

The invention claimed is:

1. A system comprising:
   a floating device disposed on top of a column of drilling fluid in an annulus of a wellbore, the floating device comprising a capsule and at least two different types of transmitters coupled to the capsule, the at least two different types of transmitters to each emit a signal in a direction up the annulus;
   at least two different types of receivers positioned in a surface region above the wellbore, the at least two different types of receivers to detect the signals emitted by the at least two different types of transmitters;
   a processor in communication with the at least two different types of receivers, the processor to determine a distance between the floating device and a reference point in the surface region based on the detected signals, the distance indicative of a level of the drilling fluid in the annulus.

2. The system of claim 1, wherein the at least one transmitter is disposed inside the capsule.

3. The system of claim 2, further comprising a power source disposed inside the capsule and in communication with the at least one transmitter.

4. The system of claim 1, wherein the at least one transmitter comprises an acoustic wave transmitter.

5. The system of claim 1, wherein the at least one transmitter comprises an electromagnetic wave transmitter.

6. The system of claim 5, wherein the electromagnetic wave transmitter comprises a light source.

7. The system of claim 1, wherein the floating device comprises at least two transmitters emitting different types of signals, the at least two transmitters disposed inside the capsule.

8. The system of claim 7, wherein the different types of signals comprise acoustic waves and electromagnetic waves.

9. The system of claim 1, further comprising a flow conduit arranged in the surface region and in fluid communication with the annulus, the flow conduit having a flow outlet for outflow of drilling fluid received from the annulus.

10. The system of claim 9, wherein the at least one receiver is positioned proximate the flow conduit.

11. The system of claim 9, further comprising a mesh cover disposed at the flow outlet to prevent the floating device from passing through the flow outlet.

12. The system of claim 1, further comprising a drill string disposed in the wellbore, wherein the drill string comprises a drill bit, and wherein the capsule has a size or flexibility to pass through a nozzle of the drill bit.

13. A method comprising:
deploying a floating device comprising at least one transmitter on top of a column of drilling fluid in an annulus of a wellbore;
positioning a surface device comprising at least one receiver in a surface region above the wellbore;
emitting a signal from the at least one transmitter in the floating device in a direction up the annulus;
detecting the signal emitted from the at least one transmitter at the at least one receiver;
determining a distance between the floating device and a reference point in the surface region from the detected signal;
emitting signals from two different types of transmitters included in the floating device;
detecting signals from the two different types of transmitters at two different types of receivers included in the surface device;
determining two distances between the floating device and the reference point in the surface region based on the detected signals by the two different types of receivers; and
recalibrating the distance determined between the floating device and the reference point at the surface region based on the two distances.

14. The method of claim 13, wherein the annulus is formed between the wellbore and a drill string disposed in the wellbore, and wherein emitting the signal, detecting the signal, and determining the distance are performed during a drilling operation with the drill string.

15. The method of claim 13, wherein the annulus is formed between the wellbore and a drill string disposed in the wellbore, and wherein emitting the signal, detecting the signal, and determining the distance are performed while pulling the drill string out of the wellbore.

* * * * *